(12) United States Patent
Gang et al.

(10) Patent No.: US 11,210,920 B2
(45) Date of Patent: Dec. 28, 2021

(54) CONFIGURABLE PARENT-CHILD SWITCH

(71) Applicant: Simmonds Precision Products, Inc., Vergennes, VT (US)

(72) Inventors: Travis Gang, Hinesburg, VT (US); Travis DeMent, Burlington, VT (US); David F. Dickie, Granby, CT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 36 days.

(21) Appl. No.: 16/748,416

(22) Filed: Jan. 21, 2020

(65) Prior Publication Data

US 2021/0225151 A1 Jul. 22, 2021

(51) Int. Cl.
*G08B 21/02* (2006.01)

(52) U.S. Cl.
CPC ..... *G08B 21/0241* (2013.01); *G08B 21/0227* (2013.01)

(58) Field of Classification Search
CPC .......... G08B 21/0241; G08B 21/0227
See application file for complete search history.

(56) References Cited

U.S. PATENT DOCUMENTS

| | | | | |
|---|---|---|---|---|
| 7,705,725 B2* | 4/2010 | Matsen | ........ | G01N 29/14 340/529 |
| 7,715,887 B2* | 5/2010 | Cloutier | ........ | H04L 12/12 455/574 |
| 8,400,061 B2* | 3/2013 | Kuang | ........ | H05B 45/395 315/77 |
| 10,078,955 B1* | 9/2018 | Gang | ........ | G08B 25/04 |
| 2004/0055829 A1* | 3/2004 | Morris | ........ | B66B 13/08 187/316 |
| 2012/0265449 A1* | 10/2012 | Ihn | ........ | B29C 65/8276 702/33 |
| 2018/0060269 A1* | 3/2018 | Kessler | ........ | G06F 13/4022 |

FOREIGN PATENT DOCUMENTS

| EP | 2910712 A1 | 8/2015 |
|---|---|---|
| EP | 3407448 A1 | 11/2018 |

OTHER PUBLICATIONS

Extended European search report issued in corresponding EP application No. 21152726.2, dated Jun. 8, 2021.

* cited by examiner

*Primary Examiner* — Thomas D Alunkal
(74) *Attorney, Agent, or Firm* — Locke Lord LLP; Scott D. Wofsy; Georgi Korobanov

(57) ABSTRACT

A system including at least a first node or subnet device configured to be commanded by a controller, a first controller configured to control operation of the first node and interface with a host outside of the system, and a second controller identical to the first controller configured to be a child to the first controller during normal operation and be a parent to a second node or subnet device.

13 Claims, 4 Drawing Sheets

CONFIGURABLE PARENT-CHILD SWITCH

BACKGROUND

Technological Field

The present disclosure relates to a switch, and more particularly to a switch of a distributed sensing system.

Description of Related Art

Traditional monitoring systems typically consist of a single federated unit located in an aircraft compartment connected to a variety of sensors and communication buses. This unit collects, processes and records data from sensors located across the entire aircraft. While these units are highly functional, they present challenges for continuous advancement, such as scalability, flexibility, mass reduction, and cost reduction. The distributed sensing system addresses these challenges in a number of ways.

Although conventional methods and systems have generally been considered satisfactory for their intended purpose, there is still a need in the art for a sensing system having improved control and flexibility. The present disclosure may provide a solution for at least one of these remaining challenges.

SUMMARY OF THE INVENTION

A health monitoring system includes a first controller configured to control operation of the node and interface with a host outside of the health monitoring system, a second controller identical to the first controller configured to be a child to the first controller and at least a first node configured to perform remote sensing and digitization of data within each of the controllers. The system can include multiple nodes, wherein at least one of the nodes can be configured to act as parent sensor interface having internal sensing capabilities and at least one node can be configured to act as a child node to the parent.

At least one of the nodes can be configured to be a piezoelectric ultra-sonic wave generator and detector or be a fiber optic based sensor. The nodes, the first controller, and the second controller can be connected by shielded, field terminable, and integral wire lead harnesses.

The system can include integral power conditioning. The first controller and the second controller can each include two switches configured toggle each controller from a parent role and a child role. Each controller can include a first transceiver connected to a serial communication line configured to communicate with an external hos, and a first switch configured to move between a first position and a second position and a second switch. The first switch in a first position can connect the external host to a first terminating resistor and can be disconnected from the second switch. The switches can be configured to toggle each of controller from a parent role and a child role. The second switch in a first position can be connected to the second transceiver and connected to the first switch in a second position. The first switch in the first position can enable the first controller to be parent to the second controller and a third controller and the first switch in the second position can enable the third controller to be a child to the second controller.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
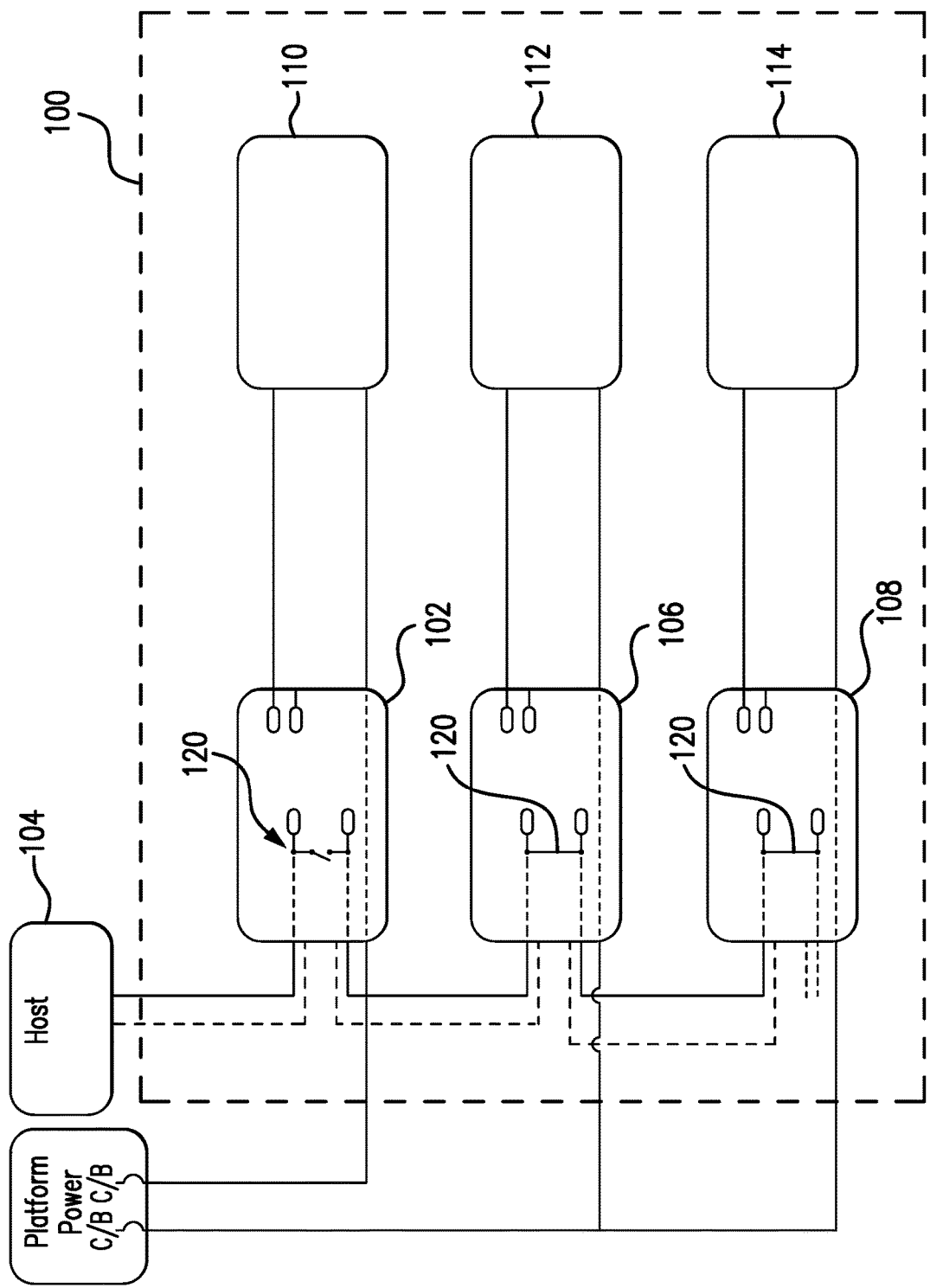
FIG. 1 is a block diagram schematic of a system showing the system in a normal operating condition.

Reference will now be made to the drawings wherein like reference numerals identify similar structural features or aspects of the subject invention. For purposes of explanation and illustration, and not limitation, a partial view of an exemplary embodiment of a node system in accordance with the invention is shown in FIG. 1 and is designated generally by reference character 100. Other embodiments of the system in accordance with the invention, or aspects thereof, are provided in FIGS. 2-4, as will be described.

FIG. 1 shows system 100 including a first controller 102 configured to control operation of the node 110, and subsequent controllers 106, 108 and interface with a host 104 outside of the system 100. The system is able to provide control to nodes 110, 112, 114, while also monitoring the health of each of the nodes 110, 112, 114. These nodes or subnet devices 110, 112, 114 can be Edge Computing Node or a Structural Health Monitoring Node. The Edge Computing Node is designed as a primary sensor interface. The Edge Computing Node includes internal sensing capability to supplement its 4-channel external sensor interface. The internal sensors of the Edge Computing Node include four temperature sensors, and a 3-axis low frequency accelerometer. These internal sensors support system sensing needs as well as component health monitoring. The Edge Computing Node has a 4-channel analog front end which can be configured to interface with a variety of discrete, analog, and digital sensors. The Edge Computing Node includes dual RS-485 communications capability for command, control and data transfer. The Edge Computing Node contains volatile and non-volatile memory to allow for buffering, processing and some limited data storage. The Edge Computing Node supports input channel processing with averaging, filtering, threshold detection and numerous other simple processing functions.

The Structural Health Monitoring Node component are based on a piezoelectric ultra-sonic wave generator and detector. Working roughly on the basis of SONAR, the Structural Health Monitoring Node detects changes from a baseline measurement in the wave propagation through a material. In this fashion, it can detect changes due to cracks, looseness, delamination, loss of fastener torque, etc. The Structural Health Monitoring Node also operates in a passive mode where it can detect impact within the monitored region. The Structural Health Monitoring Node has some integral memory and limited processing capability but the primary health monitoring processing occurs at a higher level in the network 100. The Structural Health Monitoring Node also includes integral temperature sensing used in health monitoring processing and for component health monitoring. The computing can be connected by shielded, field terminable, and integral wire lead harnesses.

The controller 102 is designed primarily as a network controller with the inherent capability to expand its role using its custom partition. The controller 102 includes RS-485 and Ethernet communication capability. The controller 102 has significant processing capability as well as data storage capacity to meet the needs of the health monitoring system 100. The controller 102 is configured to containing internal sensors (not shown) intended primarily for component health monitoring.

The controller 102 is part of a network of controllers 106, 108. The controller 102 controlled network can be a sub-network in a larger system or a complete application for smaller systems. In the sub-network case, the controller 102 coordinates the component activities of controllers 106 and 108 in normal operation, as seen in FIG. 1, with the controller 102 controlling the system-level functions e.g. coordination of vibration data acquisitions as commanded by the controller 102. The controller 102 facilitates configuration of the nodes 110 within its network. Node 110 can includes several other components in network which are all controlled by controller 102. The controller 102 is primarily responsible for coordination of multiple controller sub-networks 110 in a more complex system application, while the host 104 is responsible for top level control of the main controller 102. For simple applications e.g. monitoring an engine or auxiliary power unit, the controller 102 may be assigned as the parent and perform a host role, using the custom partition, in addition to the controller role. It is important to note the flexible, multi-role capability of the controller 102. That custom partition of the controller 102 acts external to the network and can perform host or customer specific processing functions separate from the parent and child functionality.

The controller 102 is connected to a second controller 106 and a third controller 108, identical to the first controller 102 configured to be a child to the first controller 102 during normal operation. Each of these controllers are parents to their own corresponding nodes 112, 114. Controller 102 is also connected and at least a first node 110 configured to perform remote sensing and digitization of data within each of the controllers 102, 106, 108. The system 100 can include multiple nodes, wherein at least one of the nodes can be configured to act as parent sensor interface having internal sensing capabilities and at least one node can be configured to act as a child node to the parent.

The system 100 can include integral power conditioning. The first controller 102 and the second controller 106, and third controller 108, can each include two switches 120, 122 configured toggle each controller from a parent role and a child role. Each controller 102, 106 can include a first transceiver 116 connected to a serial communication line 118 configured to communicate with an external host 104, and a first switch 120 configured to move between a first position 120a (as seen in FIG. 3) and a second position 120b (as seen in FIG. 4) and a second switch 122.

Figure 2:
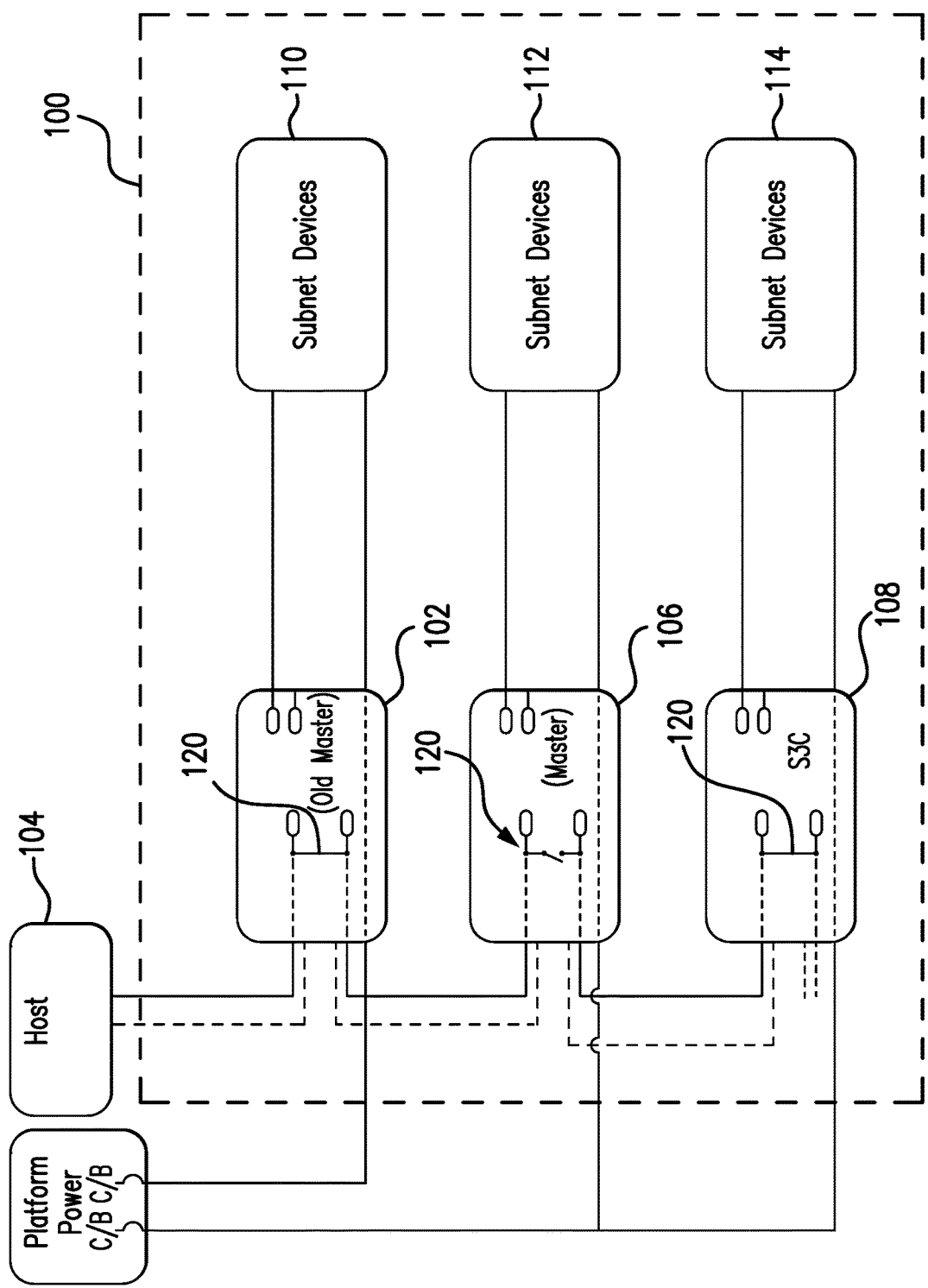
FIG. 2 is a block diagram schematic of the system of FIG. 1 showing a failure condition.
Figure 3:
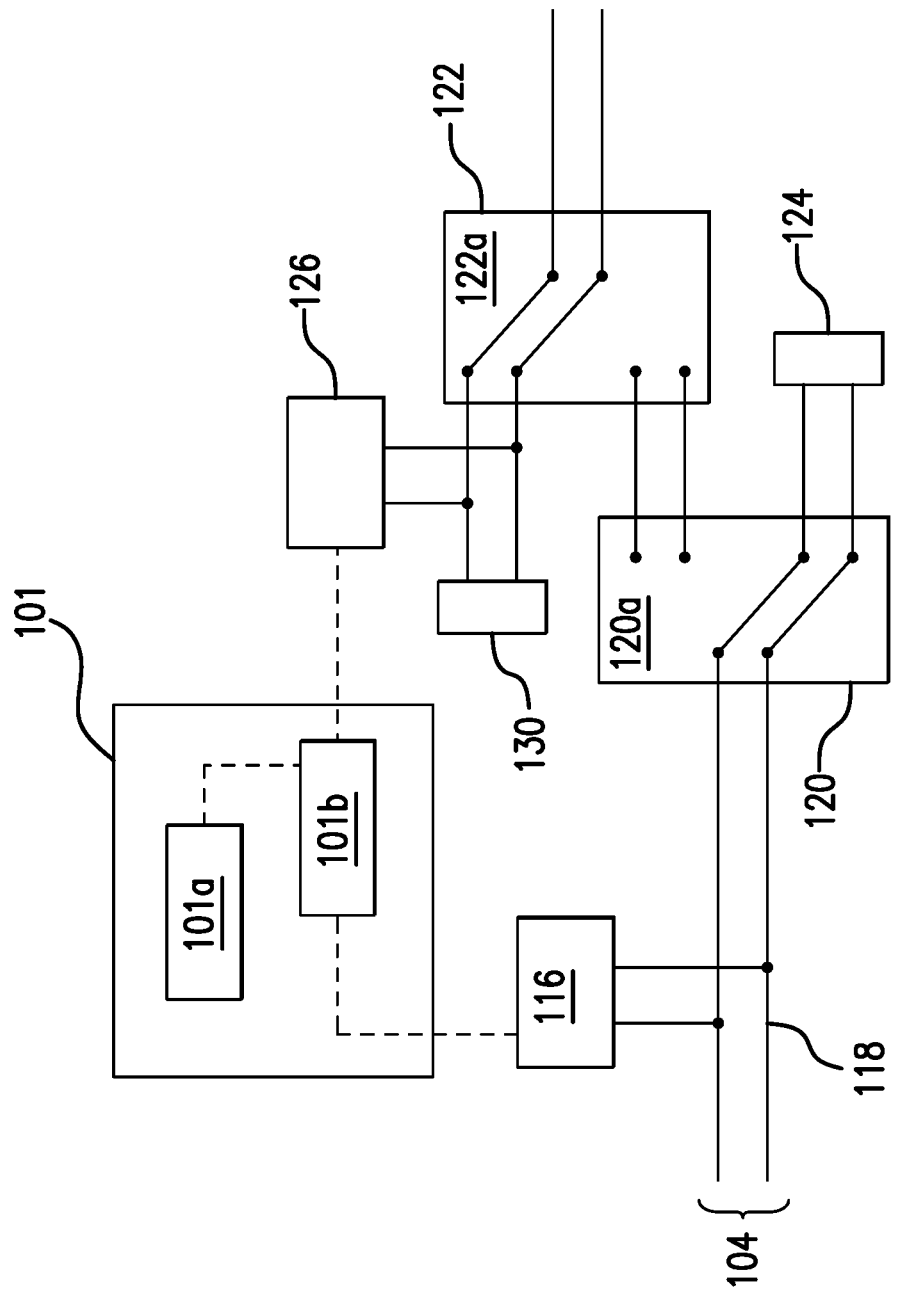
FIG. 3 is a block diagram schematic of a node within a controller of FIG. 1 with a switch in a first position.
Figure 4:
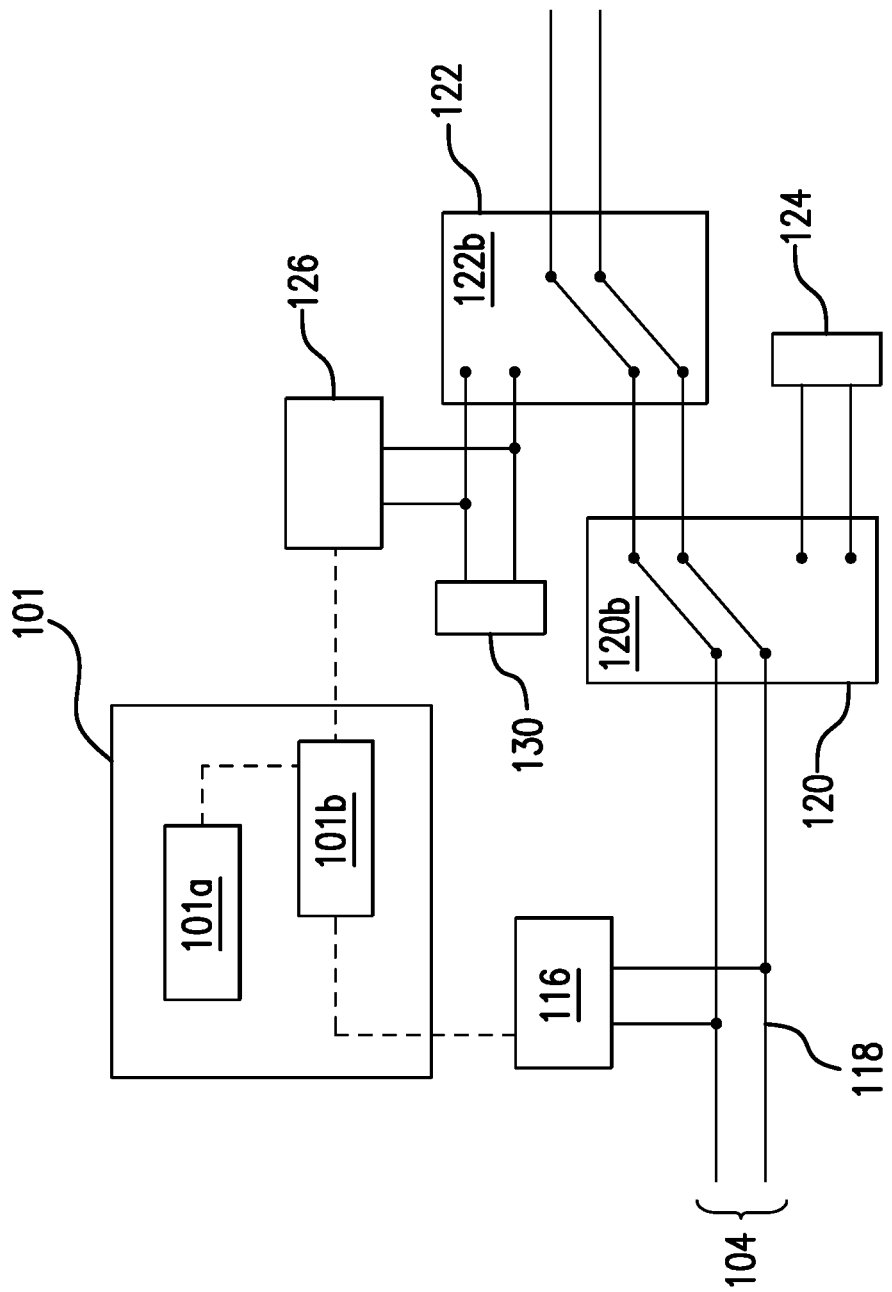
FIG. 4 is a block diagram schematic view of FIG. 3, showing the switch in a second position.

FIG. 3 shows the first switch 120 in a first position 120a connected to the external host 104 to a first terminating resistor 124 and can is disconnected from the second switch 122. The switches 120/122 are configured to toggle each controller from a parent role and a child role. The second switch 122 in a first position 122a (as shown in FIG. 4) is connected to the second transceiver 126 and connected to the first switch 120 in a second position 122a (as seen in FIG. 4). The first switch 120 in the first position 120a enables the first controller 102 to be parent to the second controller 106 and third controller 108 (as shown in FIG. 1) while the first switch 120 in the second position 120b (as shown in FIG. 4) can enable the third controller 108 to be a child to the second controller 106 (as shown in FIG. 2). The second switch in the first position is also connected to the second terminating resistor 130. When the first controller 102 suffers failure, and potentially becomes unresponsive or suffers a short, its switch 120 while actively held open and on failure switch 120 closes. A closed switch 120 enables host 104 to view previously isolated controllers. Host 104 recognizes original controller 102 is not responding and initiates a "whos out there" routine, and identifies controller two 106 as candidate for new parent controller. Controller two 106 is commanded to open switch 120 and become new parent controller to the rest of the on-line controllers in the system (108). The system can then resume operation in degraded mode with controller 102 offline.

The methods and systems of the present disclosure, as described above and shown in the drawings, provide for sensing and processing system with superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A system comprising:
   at least a first node or subnet device configured to be commanded by a controller;
   a first controller configured to control operation of the first node and interface with a host outside of the system; and
   a second controller identical to the first controller configured to be a child to the first controller during normal operation and be a parent to a second node or subnet device, wherein the first controller and the second controller each include two switches configured toggle each controller from a parent role and a child role, wherein a first switch of the two switches is configured to move between a first position and a second position, wherein the first switch in the first position enables the first controller to be parent to the second controller and a third controller, the second switch being in-line with the first switch, wherein the first controller and the second controller each include:
   a first transceiver connected to a serial communication line configured to communicate with an external host,
   a second transceiver in line with the second switch.

2. The system of claim 1, further comprising multiple nodes.

3. The system of claim 2, wherein at least one of the nodes is configured to be a piezoelectric ultra-sonic wave generator and detector.

4. The system of claim 2, wherein the at least one of the nodes is configured to be a fiber optic based sensor.

5. The system of claim 2, wherein the nodes, the first controller, and the second controller are connected by shielded, field terminable, and integral wire lead harnesses.

6. The system of claim 1, wherein the system includes integral power conditioning.

7. The system of claim 1, wherein the first controller and the first node are shut down during a first controller failure, and the second controller becomes a parent to subsequent non-failed controllers.

8. The system of claim 1, wherein the first switch in a first position connects the external host to a first terminating resistor.

9. The system of claim 1, wherein the first switch in the first position is disconnected from the second switch.

10. The system of claim 1, wherein the switches are configured to toggle each of controller from a parent role and a child role.

11. The system of claim 1, wherein the second switch in a first position is connected to the second transceiver.

12. The system of claim 1, wherein each of the transceivers are connected to a parent bus functionality controller.

13. The system of claim 1, wherein the first switch in the second position enables the third controller to be a child to the second controller.

* * * * *